Dec. 11, 1945. P. M. HALL 2,390,936
ELECTRODE HOLDER
Filed Feb. 29, 1944

INVENTOR.
Preston M. Hall.
BY ATTORNEY.

Patented Dec. 11, 1945

2,390,936

UNITED STATES PATENT OFFICE 2,390,936

ELECTRODE HOLDER

Preston M. Hall, Worcester, Mass.

Application February 29, 1944, Serial No. 524,410

4 Claims. (Cl. 219—4)

This invention relates to electrodes of the type commonly used in resistance spot welding and requiring periodic replacement. Heavy pressures are applied to such electrodes during the welding operation and it is frequently difficult to remove an outworn electrode from the conventional holder.

It is the general object of my invention to provide an improved holder by which an electrode will be firmly retained, while at the same time it may be conveniently and easily removed.

My invention further relates to arrangements and combinations of parts which will be hereinafter described and more particularly pointed out in the appended claims.

Several forms of my invention are shown in the drawing, in which

Figure 1:
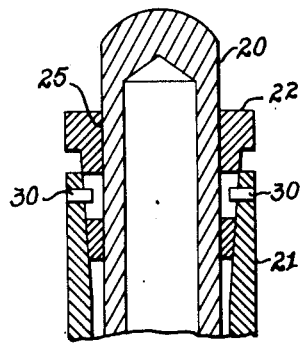
Fig. 1 is an enlarged front elevation of a preferred form of my improved holder.
Figure 2:
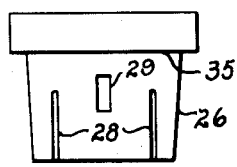
Fig. 2 is a side elevation of the holder bushing.

Referring to Figs. 1 and 2, I have shown an electrode 20, an electrode holder 21 and a holder bushing 22. The electrode 20 may be solid or may be of the usual hollow water-cooled construction.

The bushing 22 is shown as having a cylindrical inner surface 25 to fit the cylindrical outer surface of the electrode 20 and a conical outer surface 26 to fit a conical recess in the outer end of the holder 21. The bushing 26 is preferably provided with a plurality of slots 28, two of which are shown in Fig. 2, so that the lower end of the bushing may be contracted as it is forced into the holder 21.

The bushing is also preferably provided with openings 29 to receive pins or studs 30, fixed in the upper end of the holder 21. These pins keep the bushing 22 from falling out of the holder after it has been loosened for removal of the electrode.

Figure 3:
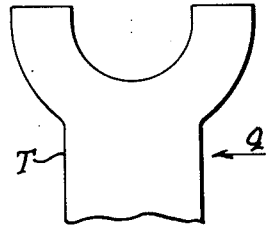
Fig. 3 is a partial plan view of a tool for conveniently releasing an electrode.
Figure 4:
Fig. 4 is a partial side elevation of the tool, looking in the direction of the arrow 4 in Fig. 3.

In order to remove the electrode, the tool T shown in Figs. 3 and 4 may be conveniently used. The bushing may be loosened by inserting the wedge-shaped end of the tool T between the shoulder 35 of the bushing 22 and the upper end of the holder 21. After the bushing has been loosened in the holder 21, the electrode 20 may be quickly and easily removed from the holder 21. Such removal is facilitated by the fact that the outer end of the electrode 20 may be lightly struck and moved sideways after the bushing 22 is partially withdrawn.

Figure 5:
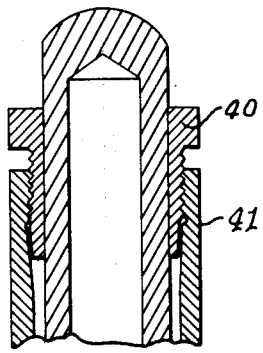
Figs. 5 and 6 are sectional elevations showing modified constructions of the holder bushing.

In the construction shown in Fig. 5, the holder bushing 40 is threaded in the upper end of the holder 41 and may be tightened or loosened by a wrench, the construction being otherwise as shown in Fig. 1.

Figure 6:
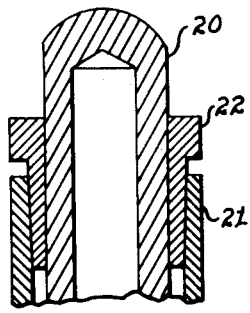

The construction shown in Fig. 6 is the same as that shown in Fig. 1, except that the openings 29 and the pins 30 are omitted.

Having thus described my invention and certain modifications thereof, it will appear that I have provided a holder by which an electrode may be firmly and accurately secured for welding operations, and that I have also provided a holder of such construction that the electrode may be quickly and easily removed when replacement is necessary.

Having thus described my invention and the advantages thereof, I do not wish to be limited to the details herein disclosed, otherwise than as set forth in the claims, but what I claim is:

1. In the art of electric welding, means for securing an electrode comprising a holder having a conical recess therein, and a tapered holder bushing seated in said conical recess and contractible to circumferentially grip said electrode, said holder and bushing having engaging threaded portions by which said bushing may be firmly seated in said holder and said threaded portions being parallel to the common axis of the holder and bushing.

2. In the art of electric welding, means for securing an electrode comprising a holder having a conical recess therein, a tapered holder bushing seated in said conical recess and contractible to circumferentially grip said electrode, and means in said holder to prevent entire displacement of said bushing from said holder but permitting limited axial movement of said bushing relative to said holder.

3. In the art of electric welding, means for securing an electrode comprising a holder having a conical recess therein, and a tapered holder bushing seated in said conical recess and contractible to circumferentially grip said electrode and said holder having studs extending into axially extended openings in said bushing, thereby preventing entire displacement of said bushing from said holder but permitting limited axial movement of said bushing relative to said holder.

4. In the art of electric welding, the combination of an externally tapered bushing split at its smaller end so as to be compressible about an electrode, an annular flange at the larger end of the bushing, a holder having a flaring recess shaped to admit and compress the smaller end of the bushing but too small for the larger portion so that the flange is spaced from the adjacent end of the holder to admit a pry between them.

PRESTON M. HALL.